United States Patent
Vajaria et al.

(10) Patent No.: US 12,406,226 B2
(45) Date of Patent: Sep. 2, 2025

(54) DISTANCE-BASED PRODUCT EVENT DETECTION

(71) Applicant: 365 Retail Markets, LLC, Troy, MI (US)

(72) Inventors: Himanshu Vajaria, Milpitas, CA (US); Krishna Vedula, Tampa, FL (US)

(73) Assignee: 365 Retail Markets, LLC, Troy, MI (US)

( * ) Notice: Subject to any disclaimer, the term of this patent is extended or adjusted under 35 U.S.C. 154(b) by 104 days.

(21) Appl. No.: 17/745,309

(22) Filed: May 16, 2022

(65) Prior Publication Data

US 2023/0368131 A1 Nov. 16, 2023

(51) Int. Cl.
*G06Q 10/087* (2023.01)
*G01S 7/4865* (2020.01)
*G01S 17/10* (2020.01)
*G01S 17/86* (2020.01)

(52) U.S. Cl.
CPC .......... *G06Q 10/087* (2013.01); *G01S 7/4865* (2013.01); *G01S 17/10* (2013.01); *G01S 17/86* (2020.01)

(58) Field of Classification Search
CPC ....... G06Q 10/087; G01S 7/4865; G01S 7/48; B65G 1/137
See application file for complete search history.

(56) References Cited

U.S. PATENT DOCUMENTS

| | | | |
|---|---|---|---|
| 8,823,521 B2 | 9/2014 | Overhultz et al. | |
| 8,938,396 B2 | 1/2015 | Swafford, Jr. et al. | |
| D808,202 S | 1/2018 | Hawkins et al. | |
| 10,169,738 B2 | 1/2019 | Jones et al. | |
| 10,318,917 B1 | 6/2019 | Goldstein et al. | |
| 10,702,076 B2 | 7/2020 | Mercier et al. | |
| 11,068,949 B2 | 7/2021 | McDonald et al. | |
| 11,244,281 B2 | 2/2022 | Bellgardt et al. | |
| 11,852,394 B1* | 12/2023 | Marti | F25C 5/187 |
| 2013/0076898 A1 | 3/2013 | Philippe et al. | |
| 2013/0262252 A1 | 10/2013 | Lakshman et al. | |
| 2013/0284806 A1 | 10/2013 | Margalit | |
| 2014/0110584 A1* | 4/2014 | Campbell | G01J 1/42 250/340 |
| 2014/0117818 A1 | 5/2014 | Dipaolo et al. | |

(Continued)

*Primary Examiner* — Florian M Zeender
*Assistant Examiner* — Vanessa Deligi
(74) *Attorney, Agent, or Firm* — Young Basile Hanlon & MacFarlane, P.C.

(57) ABSTRACT

A merchandiser device includes a storage area including multiple rows, in which each row includes multiple lanes, and in which each lane is configured to store multiple products. The merchandiser device includes a time of flight sensor positioned for use with a lane and configured to produce sensor output indicative of an event associated with a product stored in the lane. An event associated with the product is detected based on the sensor output. Identifying information for the product is determined based on the sensor output and a planogram of the merchandiser device. A quantity of the product associated with the event is determined based on the sensor output and dimensional information associated with the product. Data configured to cause an update to an inventory record associated with the product is then output based on the identifying information and the quantity.

20 Claims, 8 Drawing Sheets

(56) References Cited

U.S. PATENT DOCUMENTS

| | | |
|---|---|---|
| 2015/0019391 A1 | 1/2015 | Kumar et al. |
| 2016/0240025 A1 | 8/2016 | Bashkin |
| 2017/0004472 A1 | 1/2017 | Tkachenko et al. |
| 2018/0150685 A1 | 5/2018 | Ebrom et al. |
| 2018/0225625 A1 | 8/2018 | DiFatta et al. |
| 2018/0306958 A1* | 10/2018 | Goss .................... A47F 10/02 |
| 2018/0376193 A1 | 12/2018 | Sullivan et al. |
| 2019/0050792 A1* | 2/2019 | Kobayashi ......... G06Q 30/0201 |
| 2019/0164098 A1* | 5/2019 | Setchell ........... G06Q 10/06311 |
| 2019/0236531 A1 | 8/2019 | Adato et al. |
| 2020/0033052 A1* | 1/2020 | Maeng .................. G06N 3/045 |
| 2020/0202177 A1* | 6/2020 | Buibas ................ G06V 10/764 |
| 2021/0300680 A1* | 9/2021 | Levin ............... G08B 13/19669 |
| 2021/0342903 A1 | 11/2021 | McDonald et al. |
| 2021/0383312 A1* | 12/2021 | Nobuoka ................ G06F 16/55 |
| 2022/0229180 A1* | 7/2022 | Dolezalek ............... G01S 13/86 |
| 2023/0322145 A1* | 10/2023 | Maan ................ G06Q 10/0832 |
| | | 700/245 |
| 2024/0013147 A1* | 1/2024 | Brandt ................... B65G 1/137 |

* cited by examiner

DISTANCE-BASED PRODUCT EVENT DETECTION

TECHNICAL FIELD

This disclosure relates to detecting events associated with products available for retail using distance-based sensor measurements.

BACKGROUND

Merchandiser devices are commonly found in retail environments and used to store product inventory while awaiting purchase. A customer may retrieve one or more products stored within a merchandiser device as part of a process for purchasing those one or more products. Similarly, a customer may replace one or more products within a merchandiser device where they decide against purchasing those one or more products. Inventories of products stored within a merchandiser device may be monitored to ensure product availability for customers.

SUMMARY

Disclosed herein are, inter alia, implementations of systems and techniques for distance-based product event detection.

In some implementations, a merchandiser device as disclosed herein comprises a storage area, a time of flight sensor, and a computing device. The storage area includes multiple rows, in which each row includes multiple lanes, and in which each lane of each row is configured to store multiple products. The time of flight sensor is positioned for use with a lane of a row of the storage area and configured to produce sensor output indicative of an event associated with a product stored in the lane. The computing device is configured to detect the event based on the sensor output, determine identifying information for the product with which the event is associated and a quantity of the product associated with the event, and output data configured to cause an update to an inventory record associated with the product based on the identifying information and the quantity.

In some implementations, an apparatus as disclosed herein comprises a memory and a processor configured to execute instructions stored in the memory to detect an event associated with a product stored within a lane of a merchandiser device based on sensor output from a time of flight sensor positioned for use with the lane, determine, based on the sensor output, identifying information for the product and a quantity of the product associated with the event, and output data configured to cause an update to an inventory record associated with the product based on the identifying information and the quantity.

In some implementations, a method as disclosed herein comprises detecting an event associated with a product stored within a lane of a merchandiser device based on sensor output from a time of flight sensor positioned for use with the lane, determining identifying information for the product based on the sensor output and a planogram of the merchandiser device, determining a quantity of the product associated with the event based on the sensor output and dimensional information associated with the product, and outputting data configured to cause an update to an inventory record associated with the product based on the identifying information and the quantity.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
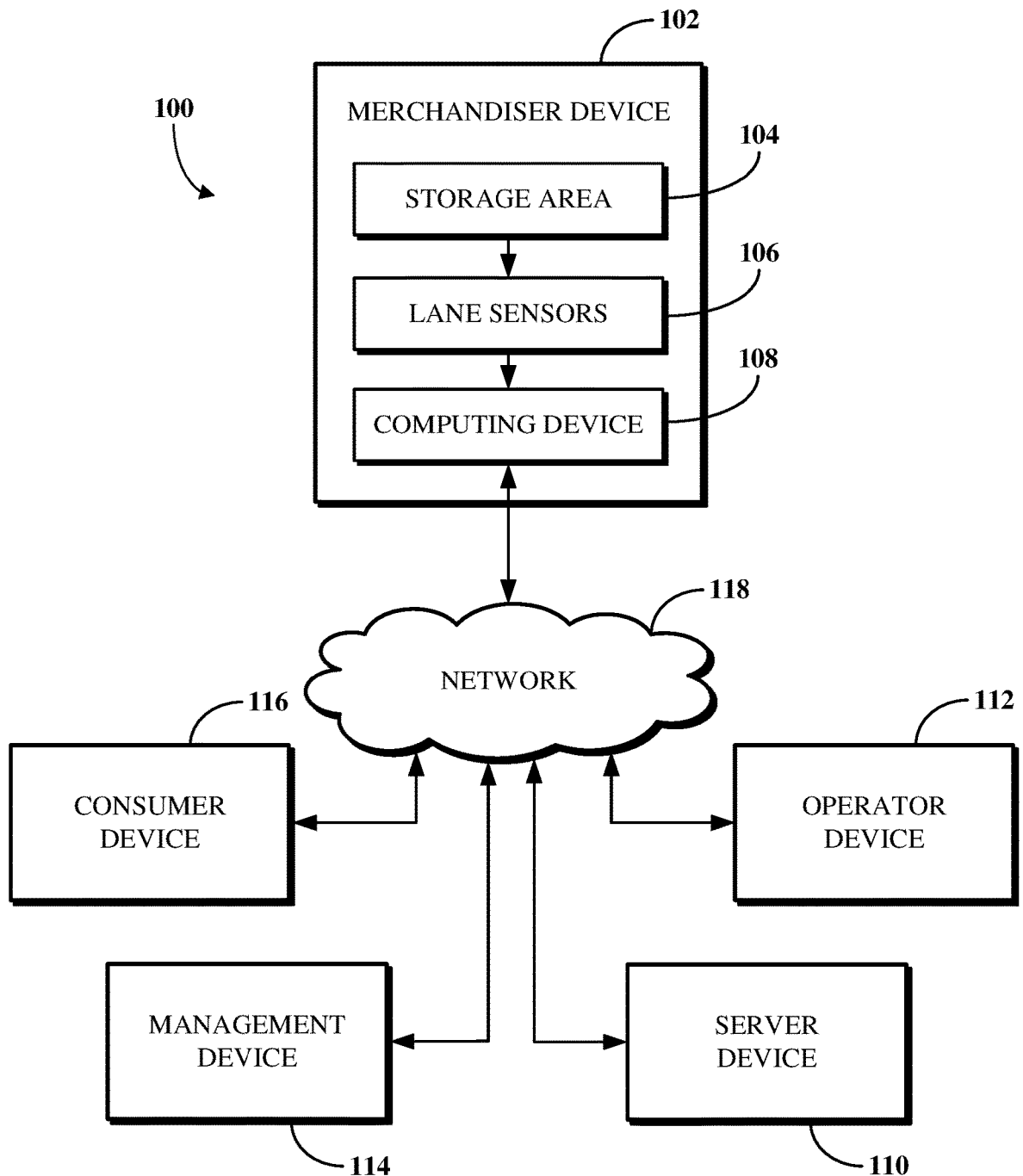
FIG. 1 is a block diagram of an example of a system for distance-based product event detection.

Shopping in a conventional brick and mortar retail store, such as a grocery or convenience store, involves shoppers retrieving products from various units (e.g., shelves, cabinets, or refrigerators), placing those retrieved products into a cart or basket, and ultimately initiating and completing a transaction to purchase those retrieved products at either a human-operated or self-service checkout area. In some cases, inventory records associated with the purchased products can be updated based on the completion of such a transaction. Units at the store are manually monitored from time to time by workers to restock product inventory on an as-needed basis and to ensure that products are not misplaced in the wrong units.

While brick and mortar retail shopping experiences have certain benefits, they also suffer from several substantial drawbacks, including that they are often inconvenient for shoppers who must wait in long checkout lines to complete a purchase transaction and that their operation generally requires a non-trivial number of human workers. One solution to these drawbacks is by way of a self-service market, which allows shoppers to conveniently purchase products directly from their personal devices or from kiosk devices without waiting in checkout lines and which can be operated without requiring human workers to continuously be present. Information associated with purchase transactions may be communicated to a device of a human operator who, on an as-needed basis, can restock the various units within the self-service market.

With the increasing popularity of self-service markets, attempts are being to implement systems for making the self-service market experience even more convenient for a shopper through automation. One particular approach to such automations includes using sophisticated systems of tens or hundreds of cameras to track shopper activity throughout a self-service market area, including to recognize products being retrieved from market units by a shopper. For example, such a self-service market may include some number of cameras disposed on a ceiling thereof and along various other surfaces to determine when a person retrieves a product from a shelf and to identify what that product is. One automation deployed in such a setting includes using the images captured by the camera system to automatically charge an account of the shopper an amount associated with the cost of a retrieved product, with the goal being saving the shopper more time by relieving the shopper of having to use their personal device or a kiosk device to complete a transaction.

However, these camera-based approaches suffer from drawbacks in at least some situations. For example, such camera-based approaches when implemented in a merchandiser device (e.g., a refrigerated unit or a non-refrigerated unit, such as a cabinet or cooler) may frequently fail to accurately detect that a product has been retrieved therefrom, determine what that product is, and determine a quantity of the product that has been retrieved. In particular, because a camera installed within a merchandiser device is typically installed behind products and is more often than not exposed to low-light conditions, elimination issues and field of blockage issues will prevent the camera from capturing images usable to accurately determine information associated with a product retrieval. As a consequence of such a failure, an account of a shopper may be improperly charged, or the system may entirely fail to charge the account. As such, camera systems, while useful in many contexts, are generally an undesirable approach when used with merchandiser devices.

Implementations of this disclosure address problems such as these using distance-based product event detection. A merchandiser device includes a storage area including multiple rows, in which each row includes multiple lanes, and in which each lane is configured to store multiple products. The merchandiser device includes a time of flight sensor positioned for use with a lane and configured to produce sensor output indicative of an event associated with a product stored in the lane. An event associated with the product is detected based on the sensor output. Identifying information for the product is determined based on the sensor output and a planogram of the merchandiser device. A quantity of the product associated with the event is determined based on the sensor output and dimensional information associated with the product. Data configured to cause an update to an inventory record associated with the product is then output based on the identifying information and the quantity.

To describe some implementations in greater detail, reference is first made to examples of hardware structures which may be used. FIG. 1 is a block diagram of an example of a system 100 for distance-based product event detection. The system 100 includes a merchandiser device 102 that stores merchandise available for retail sale in lanes. The merchandiser device 102 includes a storage area 104 with one or more rows (e.g., shelves or other horizontal dividers), in which each row includes one or more lanes capable of storing one or more products. In one non-limiting example, the storage area 104 may include six rows in which each row has eight lanes, for a total of forty eight lanes in the merchandiser device 102.

The merchandiser device 102 may be a refrigerated unit or a non-refrigerated unit. The merchandiser device 102 may in some cases include a door, for example, where the merchandiser device 102 is a refrigerated unit. In one non-limiting example, the storage area 104 may store multiple types of canned and/or bottled beverages (e.g., water, soda, and juice), in which each lane includes a single type of canned or bottled beverage. In another non-limiting example, the storage area 104 may store single-serving snack packages (e.g., chips, cookies, and crackers), in which each lane includes a single type of single-serving snack package.

The merchandiser device 102 includes lane sensors 106. In particular, one or more lanes of one or more of the rows of the merchandiser device 102 may each include one or more lane sensors 106 configured to produce sensor output indicative of an event associated with a product stored in a subject lane. The lane sensors 106 are mapped to specific lanes of the merchandiser device 102. For example, each lane of each row may have one or more lane sensors 106 thereat. The lane sensors 106 for a subject lane may be permanently integrated within or to a surface of the merchandiser device 102 abutting the subject lane (e.g., a rear interior surface of the lane, a top surface of the lane, or a bottom surface of the lane). Alternatively, the lane sensors 106 for a subject lane may be removably coupled within or to a surface of the merchandiser device 102 abutting the subject lane. Non-limiting examples of a lane sensor 106 may include a laser-based time of flight sensor, an ultrasonic-based time of flight sensor, a radio detection and ranging (radar) sensor, a light detection and ranging (LiDAR) sensor, an optical proximity sensor, or an inductive proximity sensor.

A lane sensor 106 may, in particular, be used to determine a distance to a product closest to the lane sensor. For example, where the lane sensor 106 for a given lane of the merchandiser device 102 is a time of flight sensor, the lane sensor 106 determines an amount of time it takes for a pulse of light emitted from an optical unit onboard the sensor to be reflected by a surface of a product closest to the lane sensor 106 and returned to an optical detector onboard the sensor. Sensor output representing a distance between the lane sensor 106 and that closest product may be determined in one or more ways based on the amount of time determined for the pulse of light to be returned to the light detector. For example, the distance may be determined by dividing that amount of time by two (i.e., halving it) and then multiplying the quotient thereof by the speed of light in air. Time of flight sensors and ultrasonic sensors both use cones to conduct their measurements. Time of flight sensors may generally have smaller, or narrower, cones than those of ultrasonic sensors. As such, in some cases, time of flight sensors may be used as the lane sensors 106 where a size of a subject lane is below or equal a threshold, and ultrasonic sensors may be used as the lane sensors 106 where the size of the subject lane is above that threshold.

In some implementations, one or more of the lane sensors 106 may be permanently coupled or removably coupled to a sensor strip. For example, a sensor strip may include multiple lane sensors 106 within a single lane, such as where the sensor strip is coupled to a top or bottom surface of the lane such that each of the lane sensors 106 of the sensor strip is above or below a different portion of the single lane. In another example, a sensor strip may include one or more lane sensors 106 in each of multiple lanes of a single row, such as where the sensor strip is coupled to a rear interior surface of the merchandiser device 102 such that each of the lane sensors 106 is within a different lane. In yet another example, a sensor strip may include one or more lane sensors 106 in each of multiple lanes of multiple rows, such as where the sensor strip is coupled to a rear interior surface of the merchandiser device 102 such that each of the lane sensors 106 is within a different lane and span at least two rows of the storage area 104.

The lanes of the storage area 104 may include pushing components. For example, each lane may include a pushing component. Generally, a pushing component is or otherwise refers to a mechanism which causes products to be moved toward a front of a subject lane when one or more products are retrieved from that lane. The retrieval of those products results in an open space filled by the forward motion, caused by the pushing component, of the remaining products in the lane. A pushing component may be a gravity-based pushing component which uses the natural forces of gravity to push products forward in a lane, a spring-loaded pushing component which uses a force introduced by a spring connecting the pushing component to an interior of the merchandiser device 102, or another form of pushing component. In some implementations, the lane sensors 106 may be integrated within or otherwise coupled to the pushing components for one or more lanes of the merchandiser device 102.

The merchandiser device 102 includes a computing device 108 configured to facilitating a processing of sensor output produced by the lane sensors 106 in connection with event associated with products stored in lanes of the merchandiser device 102. The computing device 108 at least includes a memory, a processor, and a network interface. The memory is configured to store instructions executable by the processor to monitor inventory states of products stored in the lanes of the storage area 104 based on events detected according to sensor output produced by the lane sensors 106. The processor is configured to execute the instructions stored in the memory. The network interface is configured to communicate output of the processing or other data to one or more other devices, for example, one or more of a server device 110, an operator device 112, a management device 114, or a consumer device 116. For example, the computing device 108 may execute, interpret, call, or otherwise run product event processing software, such as is further disclosed with respect to FIG. 3.

In particular, the computing device 108 performs operations for detecting an event associated with a product stored within a lane of a merchandiser device 102 based on sensor output from a lane sensor 106 (e.g., a time of flight sensor) positioned for use with the lane, determining identifying information for the product based on the sensor output and a planogram of the merchandiser device 102, determining a quantity of the product associated with the event based on the sensor output and dimensional information associated with the product, and outputting data configured to cause an update to an inventory record associated with the product based on the identifying information and the quantity. In some cases, the event refers to one or more products being retrieved (i.e., removed from) a lane. In some cases, the event refers to one or more products being replaced (i.e., added to) a lane.

The computing device 108 has access to a mapping associating the lane sensors 106 to the various lanes of the merchandiser device 102, dimensional information indicating sizes of products within various lanes of the merchandiser device 102, and a planogram indicating a specific layout of specific products across the various lanes and rows of the merchandiser device 102. The sensor output indicates the lane sensor 106 which produced it, which may be mapped to a specific lane. That lane may be mapped to a specific product using the planogram to determine the product associated with the event. The sensor output produced by the lane sensor 106 indicates a distance to a last product in the lane (i.e., the product that is farthest from a front of the merchandiser device 102, where a person may stand to retrieve or replace products). That sensor output can be compared against previous sensor output (e.g., taken at discrete time intervals or on an event basis) to determine a delta representing a distance that changed between the current last product and the lane sensor 106 and the previous last product and the lane sensor 106. Based on that distance, a quantity of the product associated with the event can be determined. The computing device 108 then outputs data indicative of the determined product and quantity, such as to update inventory records (e.g., by decreasing the inventory records associated with the subject product by the determined quantity thereof where the event is a product retrieval or by increasing the inventory records associated with the subject product by the determined quantity thereof where the event is a product replacement).

The planogram for the merchandiser device 102, which is used to determine a product associated with an event, maps information about specific products to specific lanes within the merchandiser device 102 in which those products are stocked. In some cases, the planogram or information associated therewith may be stored within a memory of the computing device 108. For example, the computing device 108 can access a local data store storing the planogram or information associated therewith based on a detection of an event associated with a lane of the merchandiser device 102. In particular, the computing device 108 can use the sensor output produced by a lane sensor 106 to determine which lane the event corresponds to and can then determine the product associated with the event based on information of the planogram specifying a certain product within that lane. Non-limiting examples of the planogram may include an illustrative mapping, a comma separated value file, a two-dimensional matrix or array of values, or a list.

The dimensional information associated with the various products of the planogram identifies size information for the products in one or more dimensions. In some cases, the dimensional information may identify height, width, and depth information for a product. In some cases, the dimensional information may be limited to depth information for the product, as the depth information relates to a distance occupied by the product between the front and back of a given lane. The dimensional information may, for example, be input to the system 100 from a data source. The computing device 108 can access a local data store storing the dimensional information based on a detection of an event associated with a lane of the merchandiser device 102. For example, the dimensional information may be stored in connection with the planogram (or the information associated therewith, as applicable) or in a separate data store. The computing device 108 can use the dimensional information to determine a quantity of the product that is associated with the event (e.g., a number of the product that is either retrieved or replaced as the event).

The computing device 108 may be configured to continuously monitor for events associated with lanes of the merchandiser device 102 and/or to monitor for events based on a trigger. For example, where continuous monitoring is performed, the lane sensors 106 produce sensor output on a continuous and periodic basis, such as ten times per second, to monitor for events. In another example, where a trigger is used, the computing device 108 may be placed in a wait state while awaiting the trigger and change to an active state during which the lane sensors 106 produce sensor output to monitor for events based on the trigger. Non-limiting examples of a trigger which can cause the computing device 108 to begin monitoring for events include a door of the merchandiser device 102 being opened (in implementations in which the merchandiser device 102 includes a door) or one or more images captured by a camera associated with the merchandiser device 102 depicting a potential interaction with the merchandiser device 102. For example, the merchandiser device 102 may include one or more cameras within the storage area 104 that monitor for event-related activity, such as a person reaching into the merchandiser device 102 and grabbing one or more products within a lane thereof putting one or more products back into a lane thereof, and/or activity related to other interactions with the merchandiser device 102, such as a person opening a door thereof. In such a case, images captured by those one or more cameras within the storage area 104 may be used to determine the trigger. In another example, one or more cameras may be located external to the merchandiser device 102 and to capture images depicting an area around and including the merchandiser device 102. The external one or more cameras may monitor for event-related activity or other interactions with the merchandiser device 102, as described above with respect to cameras of the storage area 104. In such a case, images captured by those one or more cameras external to the merchandiser device 102 may be used to determine the trigger. In yet another example, where the merchandiser device 102 includes a door, the merchandiser device 102 may include a door sensor (e.g., a magnetic sensor configured to determine whether the door of the merchandiser device 102 is opened or closed). In such a case, sensor output produced by that door sensor may be used to determine the trigger.

In some implementations, the computing device 108, via the lane sensors 106 and/or other components such as cameras within the storage area 104 and/or cameras external to the merchandiser device 102, may be configured to detect events other than those corresponding to product retrievals or product replacements associated with lanes of the merchandiser device 102. For example, the computing device 108 may be configured to detect wrong lane events corresponding to the replacement of one or more products within a lane other than the lane from which they were retrieved. In another example, the computing device 108 may be configured to detect suspicious activity associated with the merchandiser device 102, such as the consumption of a consumable product retrieved from the merchandiser device 102 and the subsequent replacement of the consumed product package within the merchandiser device 102.

In some implementations, the computing device 108 may be configured to simultaneously detect multiple events each associated with a different lane of the merchandiser device 102. For example, a consumer, using both of their hands, may in some cases simultaneously retrieve one or more products from each of two lanes. In such a case, the product retrievals from each lane would correspond to their own events. The detection and processing of each such event may be simultaneously performed by the computing device 108. Alternatively, in some implementations, the sensor output produced by the lane sensors 106 of the subject lanes may be added to a data structure, such as a queue, for sequential processing based on an order in which the sensor output is received by the computing device 108.

As eluded to above, the system 100 includes multiple devices which may connect to the merchandiser device 102 via the computing device 108, such as the server device 110, the operator device 112, the management device 114, and the consumer device 116. The server device 110 is a computing device that provides information usable by the computing device 108 to perform some or all of the functionality for monitoring inventory states of products stored in the lanes of the storage area 104 based on events detected according to sensor output produced by the lane sensors 106. For example, the server device 110 may provide to the computing device 108 information associated with products stored within the storage area 104, such as dimensional information thereof. In another example, the server device 110 may provide update data usable to cause the computing device 108 to update some or all of the software executed, interpreted, called, or otherwise run thereat. The server device 110 may be located on premises at the store or other location of the merchandiser device 102. Alternatively, the server device 110 may be remote from such location, for example, in a datacenter.

The operator device 112 is a computing device used by a person who operates the merchandiser device 102. For example, the operator device 112 may be a mobile device of a person who works at a store or other location at which the merchandiser device 102 is located, such as a person tasked with monitoring product inventories and maintaining stock of products in the merchandiser device 102. The operator device 112 may receive alerts in connection with one or more events detected by the computing device 108. For example, the operator device 112 may receive an alert when a stock of a given product within a merchandiser device 102 falls below a threshold. In another example, the operator device 112 may receive an alert when wrong lane events related to the replacement of a product in an incorrect lane are detected by the computing device 108. In yet another example, the operator device 112 may receive an alert when suspicious activity is detected in connection with the merchandiser device 102.

The management device 114 is a computing device used by a person who manages the merchandiser device 102 or otherwise who manages a store or other location at which the merchandiser device 102 is operated. For example, the management device 114 may be a desktop or laptop computer within an office at a retail store that includes the merchandiser device 102. The management device 114 may be used to create, assert, and/or update a planogram for the products of the merchandiser device 102. The management device 114 may receive inventory alerts related to trends in product transactions and be used to implement product stock changes based on analyses over those trends. The management device 114 may receive information related to individual events detected at the merchandiser device 102, products associated with events, transactions processed in connection with those products, and the like.

The consumer device 116 is a computing device used by a consumer who causes an event at the merchandiser device 102. For example, the consumer device 116 may be a smartphone running a mobile application or a web application (e.g., via a web browser) at which information associated with a user account registered for purchasing products from the merchandiser device 102 can be viewed. The consumer device 116 may receive alerts related to products retrieved by the consumer from the merchandiser device 102, products replaced by the consumer within the merchandiser device 102, and transactions processed in connection with products retrieved by the consumer from the merchandiser device 102. In some cases, the mobile application or web application at the consumer device 116 may be used to facilitate or otherwise complete a transaction for a product retrieved from the merchandiser device 102, for example, based on information associated with the product communicated from the computing device 108 or identified by a scanning of the product (e.g., a barcode thereof) at a camera of the consumer device 116, or the like. The consumer device 116 may display information associated with an account of the consumer before and/or after such a transaction is processed.

The computing device 108 communicates with the one or more of the server device 110, the operator device 112, the management device 114, or the consumer device 116 over a network 118. The network 118 can be or include, for example, the Internet, a local area network (LAN), a wide area network (WAN), a virtual private network (VPN), or another public or private means of electronic computer communication capable of transferring data between network-connected devices.

There may be multiple ones of the merchandiser device 102 in a retail store or other retail area. For example, a self-service convenience store area in an office building may include a first merchandiser device that stores refrigerated products and a second merchandiser device that stores non-refrigerated products. In another example, a retail store (e.g., a self-service retail store) may include tens of merchandiser devices arranged throughout the store. Generally, where there are multiple ones of the merchandiser device 102 in a given store or area, each of the merchandiser devices 102 may include its own separate computing device 108. However, in some implementations in which there are multiple ones of the merchandiser device 102 in a given store or area, the computing device 108 may be shared between the multiple merchandiser devices rather than each merchandiser device including its own separate computing device 108. For example, a single computing device 108 may be configured to process sensor output produced at each of multiple merchandiser devices according to information specific to the subject merchandiser device and to communicate the processed data, individually or in a batch, to one or more devices, as disclosed above.

Regardless of a number of the merchandiser device 102 in a given store or area, in some implementations, the computing device 108 may be an integrated circuit, (e.g., an application-specific integrated circuit (ASIC)), a field-programmable gate array (FPGA), a system-on-a-chip (SoC), or another special purpose device. For example, the computing device 108, as an ASIC, FPGA, or SoC, may be configured to perform some or all the functionality of the product event processing software disclosed herein. In some such implementations, the computing device 108 may be configured to obtain the sensor output from the lane sensors 106 and transmit the sensor output to a device over the network 118, such as the server device 110, the operator device 112, or the management device 114. For example, the server device 110, the operator device 112, or the management device 114 may in such a case be configured to perform other (e.g., some or the remaining) functionality of the product event processing software disclosed herein. Thus, while product event processing may in some implementations be performed entirely locally at the merchandiser device 102, in other implementations it may be at least partially performed remotely from the merchandiser device 102.

In some implementations, one or more of the server device 110, the operator device 112, the management device 114, and the consumer device 116 may be combined into a single device. For example, a single device may be used as both the operator device 112 and the management device 114.

In some implementations, the merchandiser device 102 may include multiple computing devices 108. For example, where the lane sensors 106 are included in sensor strips, each sensor strip may include its own computing device 108, or multiple sensor strips may share a single computing device 108. In some implementations, individual lane sensors 106 or sensor strips may be movable within the storage area 104. For example, the rows and/or lanes may be of adjustable sizes to accommodate various types of products and planograms of products. An operator of the merchandiser device 102 may thus configure the rows and/or lanes, and thus the lane sensors 106 individually or as sensor strips, as needed. In one non-limiting example, a first row of the merchandiser device 102 may have a height of ten inches measured from a bottom surface of the row to a top surface of the row and include eight lanes, while a second row of the merchandiser device 102 may have a height of two feet measured from the bottom surface to the top surface thereof and include four lanes.

Figure 2:
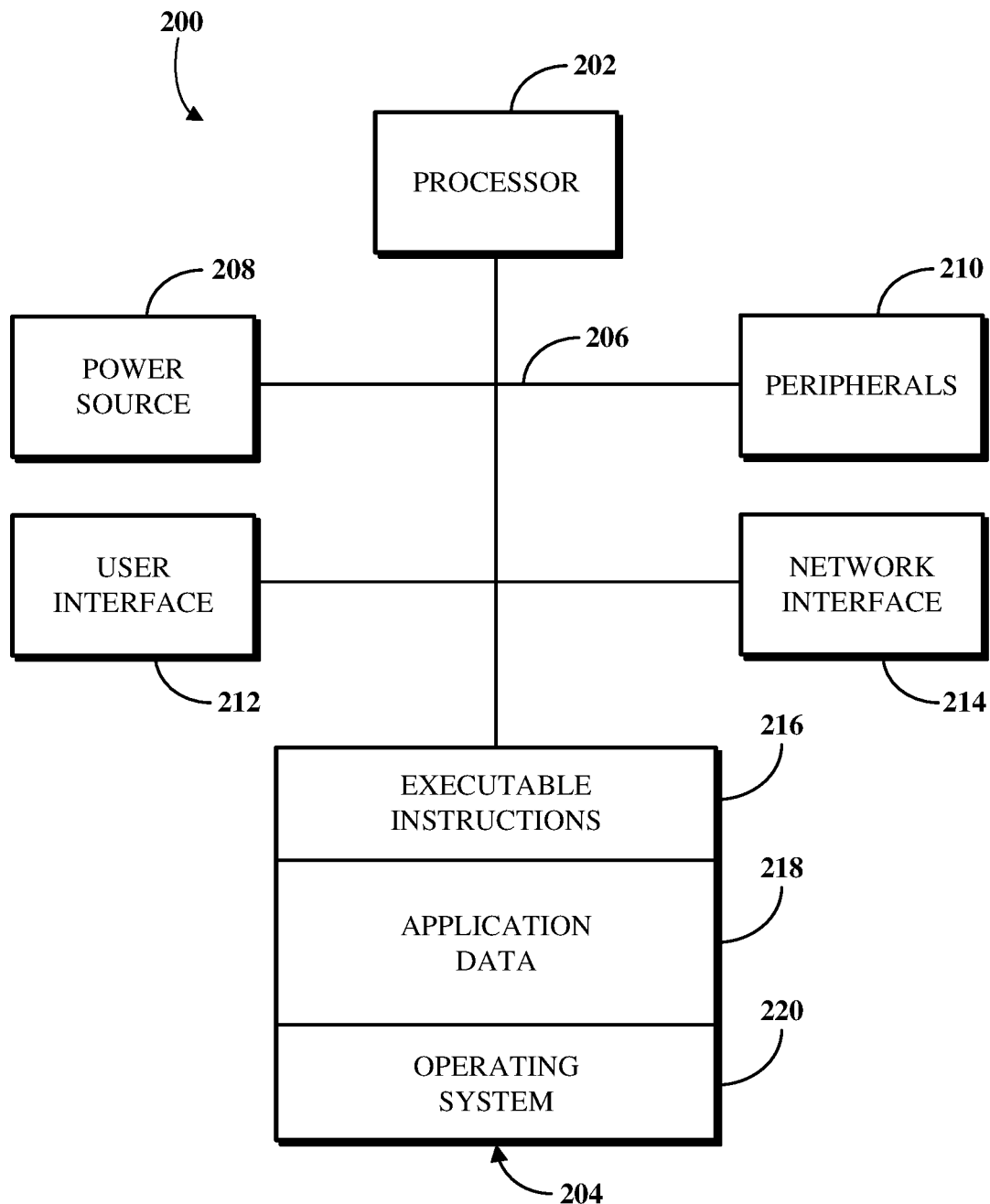
FIG. 2 is a block diagram of an example of an internal configuration of a computing device of a system for distance-based product event detection.

FIG. 2 is a block diagram of an example of an internal configuration of a computing device 200 of a system for distance-based product event detection, such as the system 100 shown in FIG. 1. The computing device 200 may, for example, be the computing device 108, the server device 110, the operator device 112, the management device 114, or the consumer device 116 shown in FIG. 1. The computing device 200 includes components or units, such as a processor 202, a memory 204, a bus 206, a power source 208, peripherals 210, a user interface 212, and a network interface 214. One of more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in any manner, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. The operating system 220 can be, for example, Microsoft Windows®, Mac OS X®, or Linux®; an operating system for a small device, such as a smartphone or tablet device; or an operating system for a large device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network, for example, a local area network, a wide area network, a machine-to-machine network, a virtual private network, or another public or private network. The network interface 214 can be a wired network interface or a wireless network interface. The computing device 200 can communicate with other devices via the network interface 214 using one or more network protocols, such as using Ethernet, TCP, IP, power line communication, Wi-Fi, Bluetooth®, infrared, GPRS, GSM, CDMA, Z-Wave, ZigBee, another protocol, or a combination thereof.

Implementations of the computing device 200 may differ from what is shown and described above with respect to FIG. 2. In some implementations, the computing device 200 can omit the peripherals 210. In some implementations, the memory 204 can be distributed across multiple devices. For example, the memory 204 can include network-based memory or memory in multiple clients or servers performing the operations of those multiple devices. In some implementations, the application data 218 can include functional programs, such as a web browser, a web server, a database server, another program, or a combination thereof.

Figure 3:
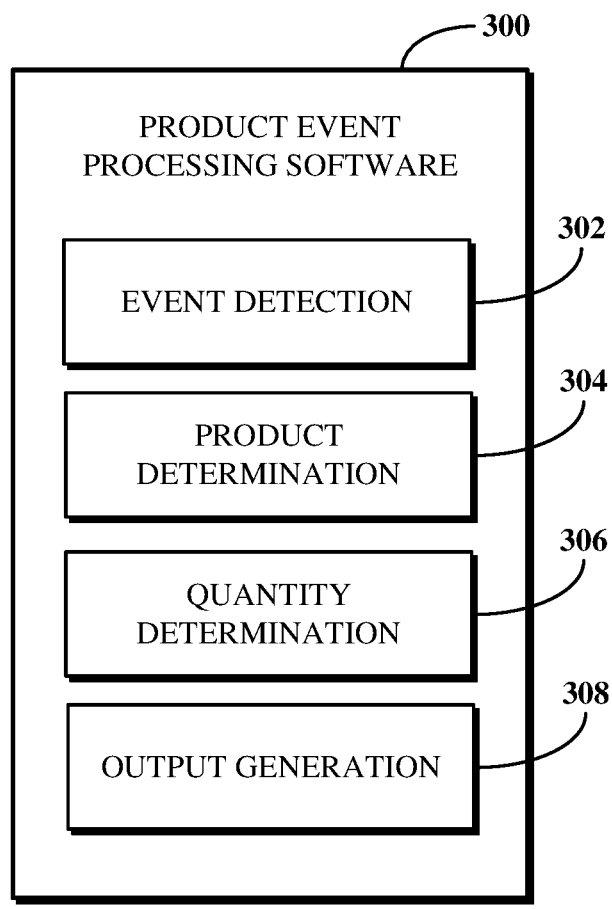
FIG. 3 is a block diagram of an example of product event detection software.

FIG. 3 is a block diagram of an example of product event detection software 300. The product event detection software 300 includes tools, such as programs, subprograms, functions, routines, subroutines, operations, and/or the like for monitoring inventory states of products stored in the lanes of a merchandiser device (e.g., the merchandiser device 102 shown in FIG. 1) based on events detected according to sensor output produced by the lane sensors (e.g., the lane sensors 106 shown in FIG. 1). The product event detection software 300 may be executed, interpreted, called, or otherwise run at the computing device 108 and/or the server device 110 shown in FIG. 1. As shown, the product event detection software 300 includes an event detection tool 302, a product determination tool 304, a quantity determination tool 306, and an output generation tool 308.

The event detection tool 302 detects an event associated with a product stored in a lane of a storage area of a merchandiser device based on sensor output produced by a lane sensor (e.g., a time of flight sensor) positioned for use with that lane. The event may, for example, correspond to one of a product being retrieved from the merchandiser device (i.e., from the lane associated with the lane sensor from which the sensor output is received) or a product being placed (e.g., replaced) within the merchandiser device (i.e., within the lane associated with the lane sensor from which the sensor output is received). The sensor output indicates a change in distance between the lane sensor and a closest product to the lane sensor in the lane. The event detection tool 302 can detect an event corresponding to a product being retrieved from the merchandiser device based on the sensor output indicating that a distance between the lane sensor and a closest product to the lane sensor in the lane has increased, such as compared to a previously determined distance therebetween. The event detection tool 302 can detect an event corresponding to a product being placed within the merchandiser device based on the sensor output indicating that a distance between the lane sensor and a closest product to the lane sensor in the lane has decreased, such as compared to a previously determined distance therebetween. Thus, the event detection tool 302 may use a previously determined distance between the subject lane sensor and the closest product to the lane sensor in the subject lane to determine whether the event is a product retrieval event or a product replacement event.

The product determination tool 304 determines identifying information for the product associated with the event detected by the event detection tool 302 based on the sensor output produced by the lane sensor and a planogram of the merchandiser device. The product determination tool 304 processes the sensor output to determine a lane of the merchandiser device with which the lane sensor is mapped. The product determination tool 304 accesses information associated with the planogram of the merchandiser device and processes that information to determine the identifying information for the product based on product information associated with the lane with which the lane sensor is mapped.

The quantity determination tool 306 determines a quantity of the product associated with the event detected by the event detection tool 302 based on the sensor output produced by the lane sensor and dimensional information associated with the product. For example, where the lane sensor is a time of flight sensor, the sensor output indicates a distance between the lane sensor and a nearest surface (i.e., a surface of a product closest to the lane sensor within the lane). The distance indicated by the sensor output can be compared against a previously determined distance between the lane sensor and that product closest to the lane sensor within the lane to determine a delta. The quantity determination tool 306 accesses information associated with the product determined by the product determination tool 304 to determine dimensional (e.g., depth) information for the product. The delta is divided by the dimensional information for the product to determine a number of products which were associated with the event (e.g., a number of products retrieved from the lane or placed within the lane).

In some implementations, the quantity determination tool 306 may determine a quantity of the product associated with the event based on the sensor output without dimensional information. For example, the sensor output may be produced by one or more lane sensors above or below the products within the lane (e.g., multiple time of flight sensors included in a time of flight sensor strip downwardly facing the multiple products stored in the lane from a top surface of the lane or upwardly facing the multiple products stored in the lane from a bottom surface of the lane). In such a case, each of the lane sensors may be positioned over or under a location of a product within the lane. The sensor output from a given one of those lane sensors may indicate a value different from one expected when a product is in the location above or below the lane sensor. For example, a time of flight sensor above a product before the event may produce sensor output indicating that a distance from the time of flight sensor to a nearest surface (i.e., the top surface of the product) is a first distance. Where that product is retrieved from the merchandiser device as part of the detected event, the time of flight sensor may now produce output indicating that the distance from the time of flight sensor to the nearest surface (i.e., the bottom of the lane) is a second distance which is greater than the first distance. The number of lane sensors for which the second distance is determined based on the sensor output may be counted and inferred as the quantity of the product associated with the event where the event corresponds to a product retrieval. The opposite is true for events corresponding to product replacements. For example, a time of flight sensor above a product before the event may produce sensor output indicating that a distance from the time of flight sensor to a nearest surface (i.e., the bottom of the lane) is a first distance. Where that product is retrieved from the merchandiser device as part of the detected event, the time of flight sensor may now produce output indicating that the distance from the time of flight sensor to the nearest surface (i.e., the top surface of the product) is a second distance which is less than the first distance. The number of lane sensors for which the second distance is determined based on the sensor output may be counted and inferred as the quantity of the product associated with the event where the event corresponds to a product placement.

The output generation tool 308 outputs data configured to cause an update to an inventory record associated with the product based on the identifying information determined by the product determination tool 304 and based on the quantity determined by the quantity determination tool 306. In particular, the data generated by the output generation tool 308 can be used to decrease an inventory record associated with the subject product by the determined quantity where the event corresponds to a product retrieval or to increase an inventory record associated with the subject product by the determined quantity where the event corresponds to a product placement. In some cases, the data generated by the output generation tool 308 may automatically update the inventory record associated with the product. In some cases, the data generated by the output generation tool 308 may be indicated to a device (e.g., the operator device 112 or the management device 114 shown in FIG. 1) to cause a user thereof to manually update the inventory record associated with the product.

In some implementations, the output generation tool 308 can output data indicative of a state of a lane of the merchandising device corresponding to a given event. States of the merchandising device can refer to a degree to which the lane is stocked (e.g., empty, partially stocked, or fully stocked) and/or a number of products remaining stocked in the lane. For example, a first distance between a front of a lane and a lane sensor of the lane may be registered (e.g., when calibrating or installing the lane sensor) and recognized as a distance indicating that the lane is empty. Similarly, a second distance between a last product and the lane sensor may be registered (e.g., after stocking the lane) and recognized as a distance indicating that the lane is fully stocked. Thus, a distance measured in connection with an event that is between the first distance and the second distance may be recognized as a distance indicating that the lane is partially stocked. Where a distance measured based on an event corresponding to a product retrieval is equal to the first distance, the output generation tool 308 may indicate an empty state of the lane to a receiving device. Where a distance measured based on an event corresponding to a product retrieval or a product replacement is between the first distance and the second distance, the output generation tool 308 may indicate a partially stocked state of the lane to a receiving device. Where a distance measured based on an event corresponding to a product replacement is equal to the second distance, the output generation tool 308 may indicate a full state of the lane to a receiving device. In some such implementations, the output generation tool 308 may maintain a state indicative of the number of products remaining stocked in the lane corresponding to an event. For example, the output generation tool 308 may monitor and update, based on each event, a number of the product stocked in the lane, in which the number of product increases with each event corresponding to a product replacement and decreases with each event corresponding to a product retrieval. For example, for each event, the output generation tool 308 may increment a current count of the product associated with the lane by the quantity of product determined by the quantity determination tool 306. The data indicative of a state of a lane of the merchandising device corresponding to a given event can be transmitted (e.g., as an alert) to one or more devices, for example, the operator device 112 and/or the management device 114.

In some implementations, the output generation tool 308 may generate and output an alert associated with a forecasted inventory event associated with the product corresponding to a given event. For example, an inventory event associated with the product may be forecasted based on the event detected by the event detection tool 302 and based on one or more historical events associated with the lane. An alert associated with the forecasted inventory event may then be output to a device (e.g., the operator device 112) associated with the merchandiser device In some implementations, to prevent use of irrelevant data for analyzing a detected event, the product determination tool 304 and/or the quantity determination tool 306 may be limited to using data within a window based on a time of the detected event to determine a product and/or a quantity thereof, respectively. For example, a sliding window of a defined size (e.g., three seconds) may be used to identify sensor output and other data for detecting an event and determining product information (e.g., identifying information and quantity) associated with the event. In another example, a window beginning with a trigger (e.g., a determination that a door of the merchandiser device has been opened) for activating one or more sensors or cameras of the merchandiser device and ending with a determination that an interaction with the merchandiser device has ended (e.g., based on the door of the merchandiser device closing) may be used to identify sensor output and other data for detecting an event and determining product information (e.g., identifying information and quantity) associated with the event.

In some implementations, the product event detection software 300 may include functionality for creating and/or updating a planogram of the merchandiser device associated with the event. For example, after the merchandiser device is stocked for a first time, the planogram thereof may be generated. Generating the planogram for the merchandiser device can include using an image depicting the stocked merchandiser device to identify products in each of the lanes of each of the rows of the storage area of the merchandiser device. For example, object detection and recognition processes can be performed against the image depicting the stocked merchandiser device to identify the products therein. In another example, manual user input specifying the products and their locations within lanes of the rows of the storage area of the merchandiser device may be used to generate the planogram. In another example, at some point after the planogram is generated, the planogram may be updated. For example, the planogram may be updated based on a restocking of products in the planogram. Updating the planogram can include using an image depicting the restocked merchandiser device to identify products in each of the lanes of each of the rows of the storage area of the merchandiser device. For example, object detection and recognition processes can be performed against the image depicting the restocked merchandiser device to identify the products therein. In another example, manual user input specifying the products and their locations within lanes of the rows of the storage area of the merchandiser device after a restocking thereof may be used to update the planogram. In yet another example, where sensor strips are used within lanes of the merchandiser device (e.g., coupled to a top or bottom surface of each lane), the lane sensors of a given sensor strip can determine dimensional information for the products in the lane and compare that dimensional information to dimensional information known to the current planogram. For example, where the lane sensors are time of flight sensors, the dimensional information determined by the lane sensors of a sensor strip within a lane can indicate a distance between the lane sensors and the products above or below them. Those distances can be compared against the distances that should be determined based on the dimensional information stated in the planogram. In the event of a mismatch, the mismatch can be flagged to an operator (e.g., via an alert transmitted to the operator device 112) to cause the operator to review the planogram for potential updates.

In some implementations, the product event detection software 300 may include functionality for updating an account associated with a consumer causing the event by an amount based on the identifying information for the product and the quantity of the product. For example, an account associated with a consumer causing the event may be determined by the product event detection software 300. Determining the account associated with the consumer may include performing facial recognition against images captured external to the merchandiser device (e.g., by a camera coupled to a front of the merchandiser device and pointing away from the merchandiser device) to determine a face of the consumer which may then be matched against an account associated with an operator or other service provider of the merchandiser device. Alternatively, determining the account associated with the consumer may include using information communicated from a consumer device of the consumer in connection with the event (e.g., a message transmitted from the consumer device to a computing device of the merchandiser device or to a server device based on a scanning, by a camera of the consumer device, of a product retrieved from or placed within the merchandiser) to identify the consumer. Based on the event, the account determined as being associated with the consumer may be automatically updated by the product event detection software 300 by an amount based on the identifying information and quantity. For example, where the event corresponds to the product being retrieved from the merchandiser device, the update corresponds to a charge to the account. In another example, where the event corresponds to the product being placed within the merchandiser device, the update corresponds to a refund to the account.

Figure 4:
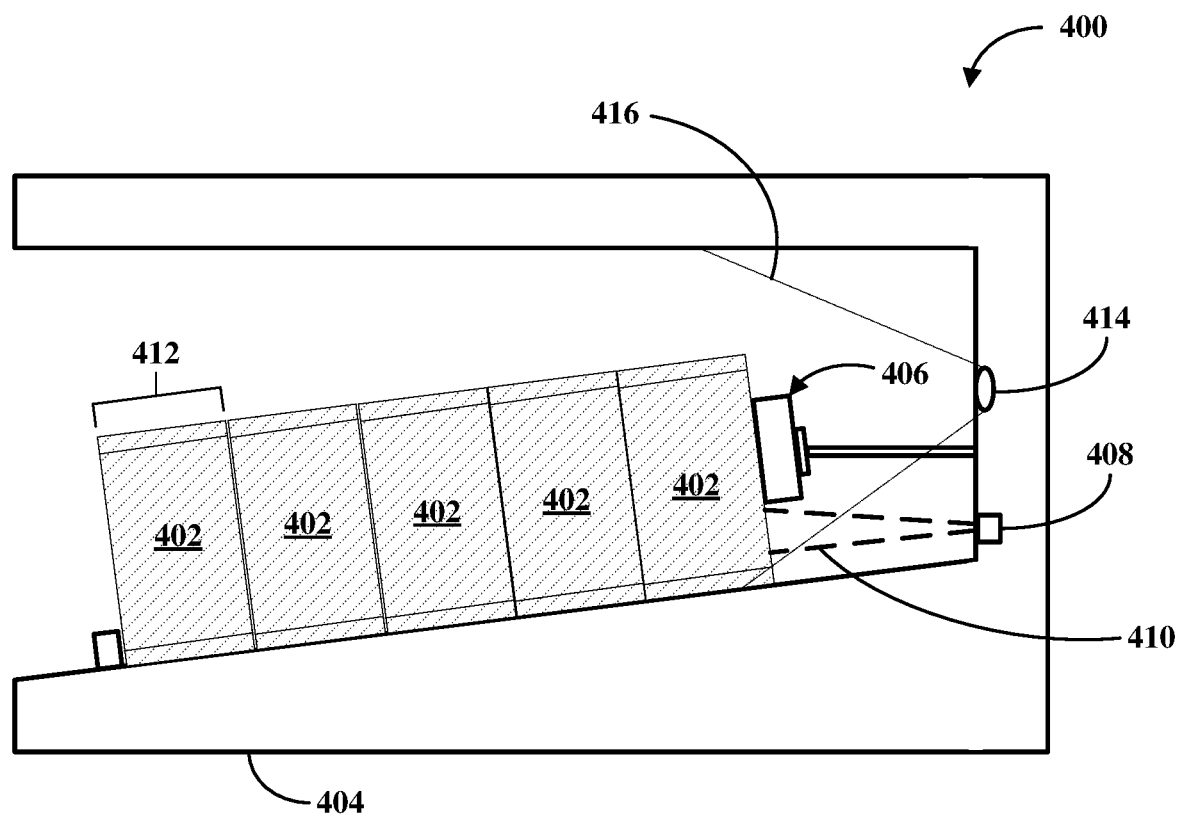
FIG. 4 is a side view illustration of a first example configuration of a merchandiser device used with a system for distance-based product event detection.

FIG. 4 is a side view illustration of a first example configuration of a merchandiser device 400 used with a system for distance-based product event detection, for example, the system 100 shown in FIG. 1. As shown, multiple products 402 are stored within a lane 404 of the merchandiser device 400. A pushing component 406 pushes the products 402 forward (i.e., toward the opening on the left side of the figure, representing an area from which a consumer may retrieve one of the products 402) from a rear interior surface of the merchandiser device 400. A lane sensor 408, such as a time of flight sensor, emits a cone 410 (e.g., a laser or an ultrasonic signal), which is reflected off of a rear surface of the product 402 nearest to the lane sensor 408 within the lane 404 (i.e., the product 402 shown as abutting the pushing component 406). Dimensional information 412 for the products 402 indicates at least a depth of the products 402. When an event is detected, sensor output produced by the lane sensor 408 is processed against a planogram of the merchandiser device 400 to determine identifying information for the products 402 and to, based on the dimensional information 412, determine a quantity of the products 402 retrieved or placed as part of the detected event. Optionally, a camera 414 having a field of view 416 within the lane 404 may capture images usable to determine the identifying information for the products 402 and/or the quantity of the products retrieved or placed as part of the detected event.

In some implementations, the merchandiser device 400 may omit the pushing component 406. For example, the incline of the bottom surface of the lane 404 may be steep enough to allow a natural force of gravity to move ones of the products 402 downwardly toward a front of the lane upon the retrieval of one or more of the products 402.

Figure 5:
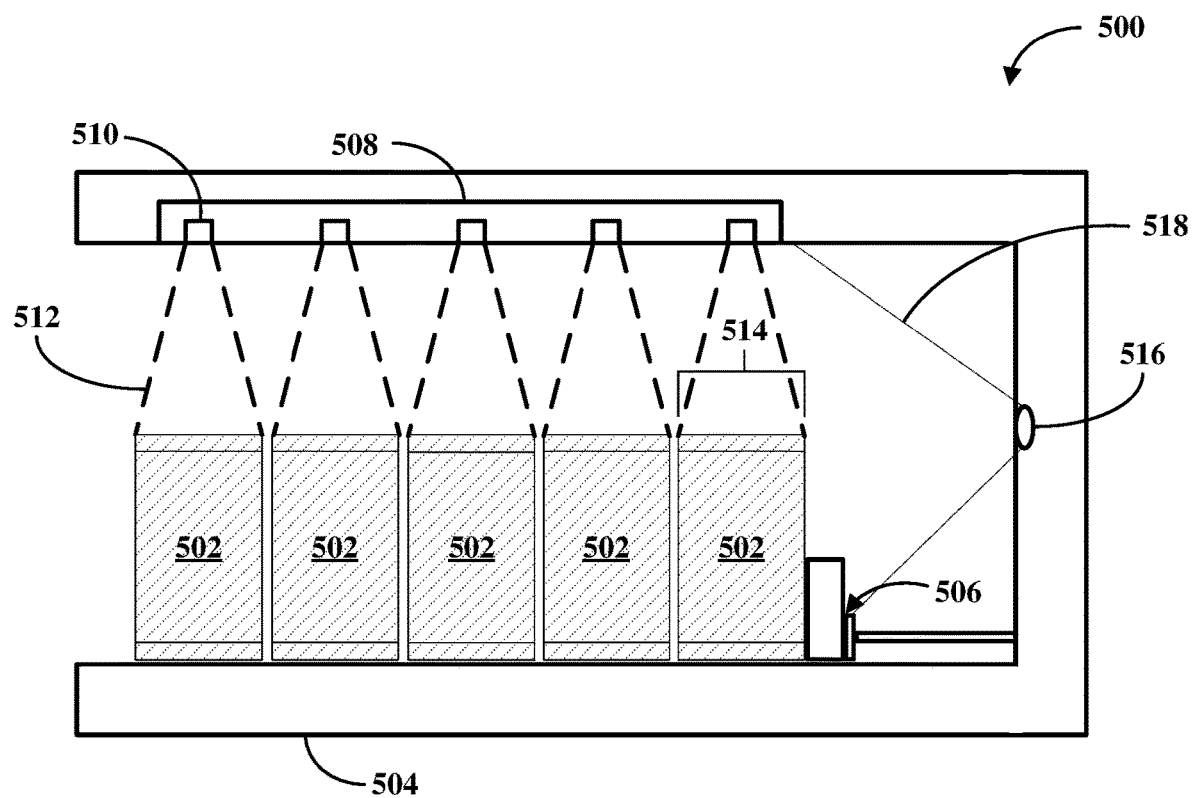
FIG. 5 is a side view illustration of a second example configuration of a merchandiser device used with a system for distance-based product event detection.

FIG. 5 is a side view illustration of a second example configuration of a merchandiser device 500 used with a system for distance-based product event detection, for example, the system 100 shown in FIG. 1. As shown, multiple products 502 are stored within a lane 504 of the merchandiser device 500. A pushing component 506 pushes the products 502 forward (i.e., toward the opening on the left side of the figure, representing an area from which a consumer may retrieve one of the products 502) from a rear interior surface of the merchandiser device 500. A sensor strip 508 includes multiple lane sensors 510, such as a time of flight sensors, above the products 502. The lane sensors 510 each emits a cone 512 (e.g., a laser or an ultrasonic signal). Each cone 512 is reflected off of a top surface of the product 502 below the subject lane sensor 510 within the lane 504. Dimensional information 514 for the products 502 indicates at least a depth of the products 502. When an event is detected, sensor output produced by the lane sensors 510 of the sensor strip 508 is processed against a planogram of the merchandiser device 500 to determine identifying information for the products 502 and to, based on the dimensional information 514, determine a quantity of the products 502 retrieved or placed as part of the detected event. Optionally, a camera 516 having a field of view 518 within the lane 504 may capture images usable to determine the identifying information for the products 502 and/or the quantity of the products retrieved or placed as part of the detected event.

In some implementations, the merchandiser device 500 may omit the pushing component 506. For example, the number of products 502 present within the lane 504 at a given time may be determined based on sensor output indicating, for each lane sensor 510, a distance that is less than a distance from the lane sensors 510 to a bottom surface of the lane 504. Thus, while the products 502 may not be conveniently pushed forward toward the opening at the left side of the figure from which a consumer may retrieve the products 502 when the pushing component 506 is omitted, the distance-based determinations may still be performed.

To further describe some implementations in greater detail, reference is next made to examples of techniques used by a system for request processing based on proximity detection. The techniques described herein can be executed using computing devices, such as included within or otherwise using the systems, software, and devices described with respect to FIGS. 1-5. The techniques described herein can be performed, for example, by executing a machine-readable program or other computer-executable instructions, such as routines, instructions, or programs described according to Java, JavaScript, C++, or other such routines or instructions. The steps, or operations, of the techniques described herein or any other technique, method, process, or algorithm described in connection with the implementations disclosed herein can be implemented directly in hardware, firmware, software executed by hardware, circuitry, or a combination thereof.

Although the techniques described herein are each shown as a series of operations for clarity, implementations of those techniques or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

Figure 6:
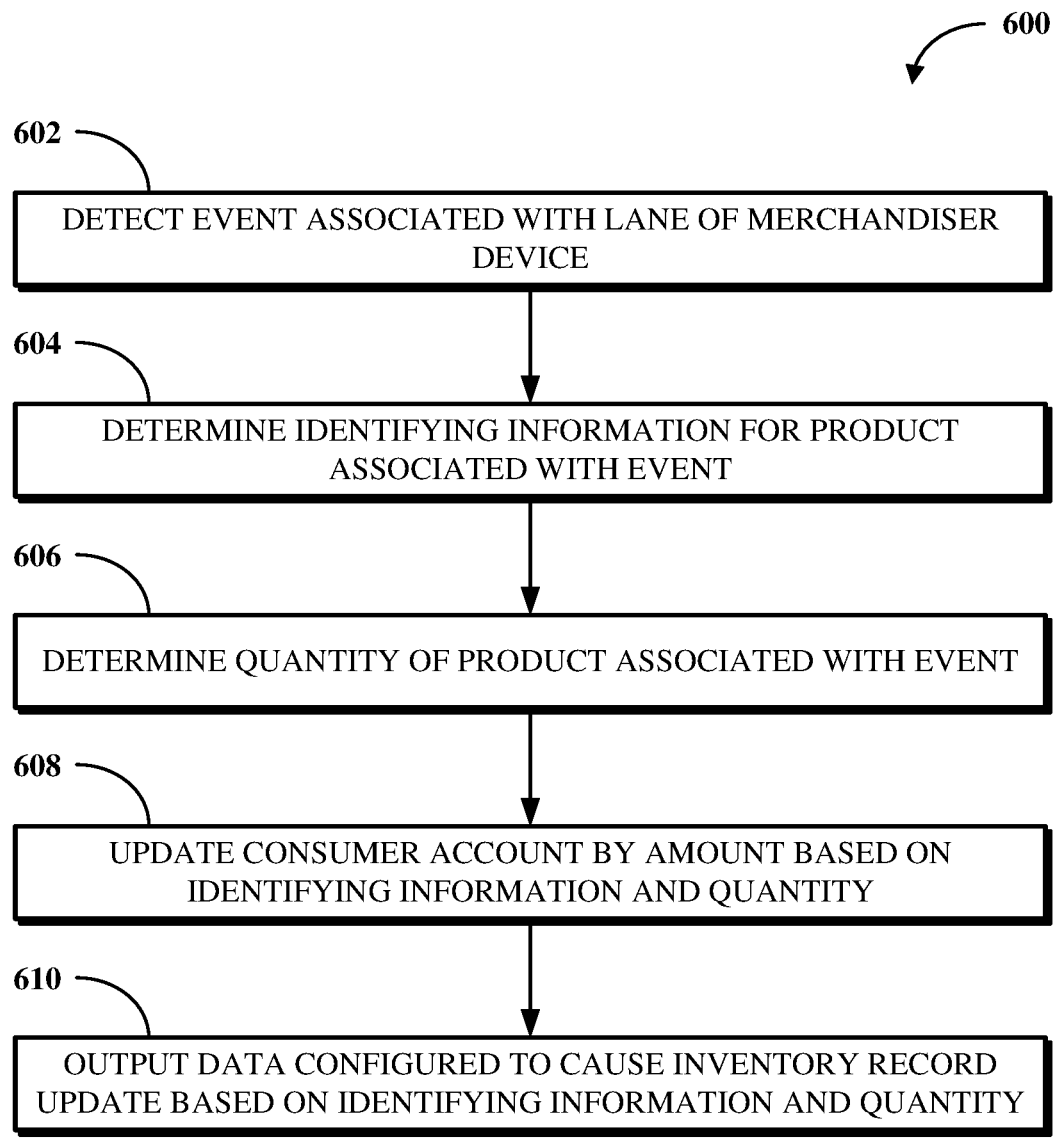
FIG. 6 is a flowchart of an example of a technique for distance-based product event detection.

FIG. 6 is a flowchart of an example of a technique 600 for distance-based product event detection. At 602, an event associated with a lane of a merchandiser device is detected. The event corresponds to one of a product retrieval from the lane of the merchandiser device or a product placement within the lane of the merchandiser device. For example, a product retrieval event may be detected when a consumer retrieves one or more products from a lane of the merchandiser device, such as to purchase those one or more products. In another example, a product placement event may be detected when a consumer places (e.g., replaces) one or more products from a lane of the merchandiser device, such as to not purchase those one or more products. The event is detected based on sensor output produced by a lane sensor (e.g., a time of flight sensor) positioned for use with a lane of a row of a storage area of the merchandiser device. The storage area of the merchandiser device includes multiple rows, in which each row includes multiple lanes, and in which each lane of each row is configured to store multiple products. The sensor output is indicative of (e.g., can be processed to detect) the event.

In some cases, the lane sensor positioned for use with the lane associated with the detected event may be coupled to a portion of a rear interior surface of the storage area of the merchandiser device. In some cases, the lane sensor may be one of multiple time of flight sensors included in a sensor strip coupled to the rear interior surface of the storage area, in which each lane sensor of the sensor strip may be positioned for use with a different lane of the multiple lanes for a given row of the multiple rows of the storage area. In some cases, the lane sensor is one of multiple lane sensors included in a sensor strip downwardly facing the multiple products stored in the lane from a top surface of the lane or upwardly facing the multiple products stored in the lane from a bottom surface of the lane.

At 604, identifying information for the product associated with the event is determined. The identifying information is information usable to identify the product (e.g., a name or other identifier of the product). The identifying information is determined based on the sensor output produced by the lane sensor positioned for use within the lane associated with the event and based on a planogram of the merchandiser device. In particular, the sensor output may indicate or otherwise include information usable to identify a location, within the planogram of the merchandiser device, of the lane from which the sensor output derived (i.e., the lane in which the lane sensor that produced the sensor output is located). In that the planogram may specify which products are in which lanes, the location of that lane is then compared against the planogram to determine the products stored within that lane.

In some implementations in which the merchandiser device includes a camera configured to capture images representative of activity within the storage area, determining the identifying information for the product associated with the event may include determining the identifying information based on the images. For example, a computer vision processing aspect may process the images to detect the product within the images and then to perform object recognition against the detected product within the images to identify the product. For example, performing the object recognition can include searching an image data store (e.g., a data base or other store of images of products) based on the detection of the product within the images to produce output corresponding to identifying information associated with contents of the image data store. In some such implementations in which the merchandiser device includes a door and a door sensor configured to detect when the door is open, the technique 800 can include activating the camera based on output from the door sensor. For example, the camera may await activation while in a wait state and change to an active state based on a trigger, such as the door sensor indicating that the door of the merchandiser device has been opened.

At 606, a quantity of the product associated with the event is determined. The quantity of the product associated with the event refers to the number of the product that was retrieved from the lane (i.e., during a product retrieval event) or placed within the lane (i.e., during a product placement event). The quantity of the product is determined based on the sensor output produced by the lane sensor positioned for use within the lane associated with the event and based on dimensional information associated with the product. Determining the quantity of the product associated with the event may, for example, include determining the quantity based on a comparison of dimensional information associated with the product against a changed distance, indicated by the sensor output, between the time of flight sensor and a closest product to the time of flight sensor in the lane. For example, where the event corresponds to the product being retrieved from the merchandiser device, the sensor output produced by the lane sensor may indicate that a distance between the lane sensor and a closest product to the lane sensor in the lane has increased based on the product being retrieved from the merchandiser device. In another example, where the event corresponds to the product being placed within the merchandiser device, the sensor output produced by the lane sensor may indicate that a distance between the lane sensor and a closest product to the lane sensor in the lane has decreased based on the product being placed within the lane.

In some implementations where the merchandiser device includes a sensor strip, determining the quantity of the product associated with the event may include determining the quantity based on multiple sensor outputs from the multiple lane sensors of the sensor strip. In some implementations, the lane associated with the event may include a pusher component that pushes the multiple products stored in the lane toward a door of the merchandiser device. For example, where the event corresponds to the product being retrieved from the merchandiser device, the changed distance may be caused by the pusher component pushing remaining products stored in the lane forward and may indicate that a distance between the lane sensor and a closest product to the lane sensor in the lane has increased. In another example, where the event corresponds to the product being placed within the merchandiser device, the changed distance may be caused by the pusher component being moved toward the rear interior surface of the storage area and may indicate that the distance between the lane sensor and the closest product has decreased.

In some implementations, the quantity of the product may be determined without the dimensional information associated with the product. For example, where the lane sensor is one of multiple lane sensors of a sensor strip coupled to a top surface or bottom surface of lane, in which each of the multiple lane sensors is positioned over a location at which a product may be stored within the lane, the sensor output produced by each of the multiple lane sensors can indicate a distance corresponding to a presence of a product in a given location or an absence of a product in the given location. Thus, to determine the quantity of the product associated with the detected event, a number of products within the lane prior to the detected event may be maintained and compared against a number of products determined based on the sensor output produced by the multiple lane sensors of the sensor strip.

At 608, an account associated with a consumer causing the event is updated by an amount based on the identifying information for the product and the quantity of the product. For example, an account associated with a consumer causing the event may be determined. Determining the account associated with the consumer may include performing facial recognition against images captured external to the merchandiser device (e.g., by a camera coupled to a front of the merchandiser device and pointing away from the merchandiser device) to determine a face of the consumer which may then be matched against an account associated with an operator or other service provider of the merchandiser device. Alternatively, determining the account associated with the consumer may include using information communicated from a consumer device of the consumer in connection with the event (e.g., a message transmitted from the consumer device to a computing device of the merchandiser device or to a server device based on a scanning, by a camera of the consumer device, of a product retrieved from or placed within the merchandiser) to identify the consumer. Based on the event, the account determined as being associated with the consumer may be automatically updated by an amount based on the identifying information and quantity. For example, where the event corresponds to the product being retrieved from the merchandiser device, the update corresponds to a charge to the account. In another example, where the event corresponds to the product being placed within the merchandiser device, the update corresponds to a refund to the account.

At 610, data configured to cause an update to an inventory record associated with the product based on the identifying information for the product and the quantity of the product is output. Where the event corresponds to the product being retrieved from the merchandiser device, the data may indicate to decrease an inventory count associated with the inventory record by the quantity. Where the event corresponds to the product being placed within the merchandiser device, the data may indicate to increase the inventory count associated with the inventory record by the quantity. The data may be transmitted from the merchandiser device to an operator device, a management device, or another device to cause information associated with the updated inventory record to be displayed thereat or to otherwise configure such device to eventually display such updated inventory record.

Figure 7:
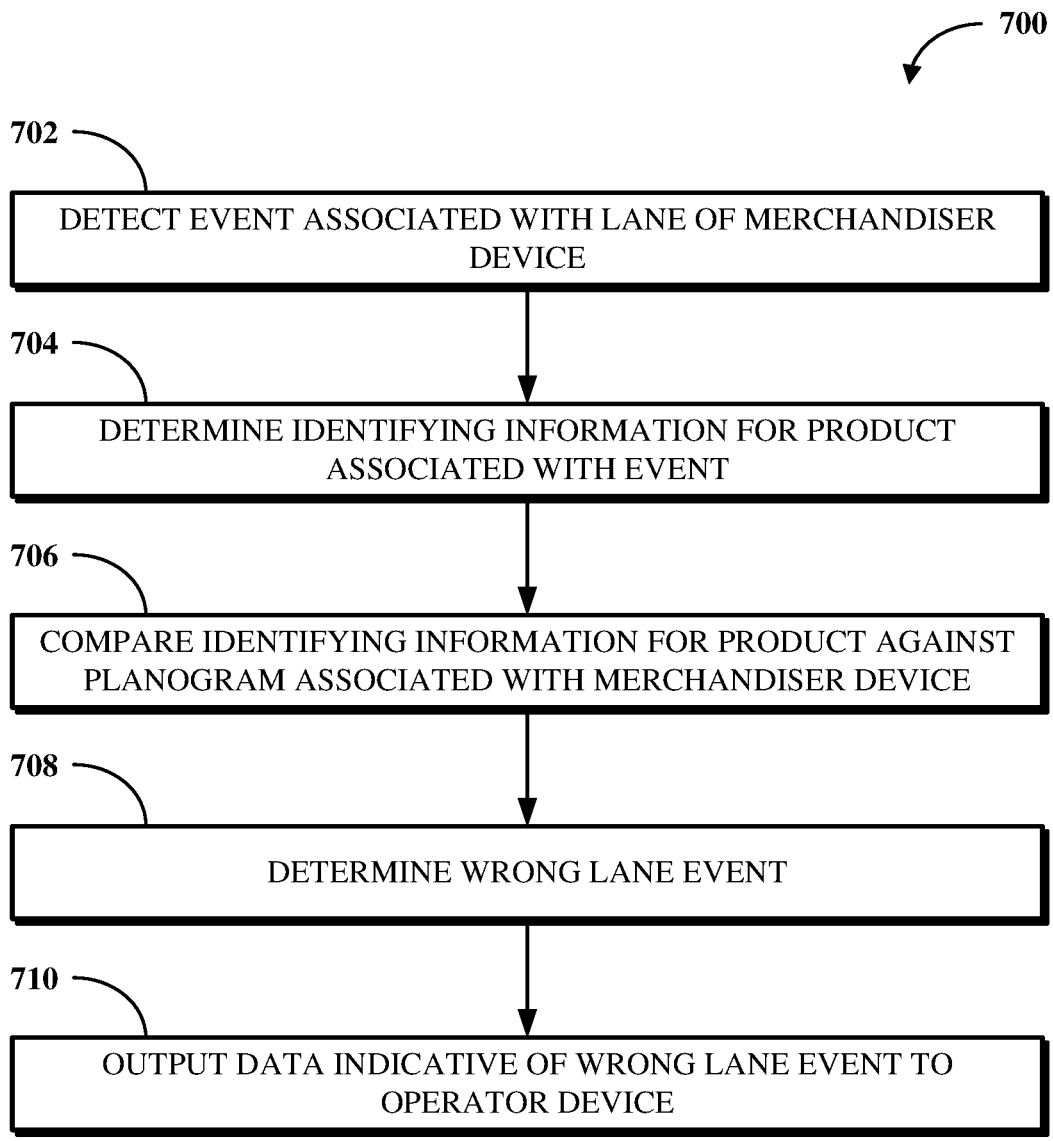
FIG. 7 is a flowchart of an example of a technique for wrong lane event determination.

FIG. 7 is a flowchart of an example of a technique 700 for wrong lane event determination. At 702, an event associated with a lane of a merchandiser device is detected. For example, the detection of the event may be performed the same as or substantially similar to the detection of the event described above with respect to the technique 600 shown in FIG. 6.

At 704, identifying information for the product associated with the event is determined. Based on the detection of the event, a camera pointing toward a front of the merchandiser device may capture one or more images of the merchandiser device depicting products within the front of one or more lanes of the merchandiser device. For example, the camera may be disposed within the merchandiser device. In another example, the camera may be disposed externally to the merchandiser device. The one or more images are processed using object detection and recognition to determine the identifying information for the product, such as based on a data store of products.

At 706, the identifying information for the product is compared against a planogram associated with the merchandiser device. The comparison between the identifying information for the product and the planogram associated with the merchandiser device is to determine whether the identifying information for the product matches similar information for products which are known to be within the subject lane of the merchandiser device, as may be referenced within or otherwise by the planogram.

At 708, based on the comparison between the identifying information for the product and the planogram associated with the merchandiser device, a wrong lane event is determined. A wrong lane event generally refers to a placement of a product in a lane in which it is not meant to be, such as according to a planogram of the subject merchandiser device. Determining the wrong lane event can thus include determining, based on the output of the comparison between the identifying information for the product and the planogram associated with the merchandiser device, that the product associated with the detected event is different from products which are associated with the subject lane within the planogram. The wrong lane event may thus be detected even where the product in question has same dimensional information as the products which are expected, per the planogram, to be in the subject lane. For example, the wrong lane event may be the result of a determination, based on one or more images captured using a camera of the merchandiser device, that a product having same dimensional information as a product which is actually meant for storage in the subject lane and intended for storage within a different lane of the merchandiser device is incorrectly stored within the subject lane.

In some implementations, the identifying information for the product may include dimensional information for the product. For example, the dimensional information for the product may be determined based on sensor output indicating a distance between a subject lane sensor and the product and the dimension information of products which are supposed to be in the subject lane may be accessed within the planogram based on the identification of the lane associated with the event. Where the dimensional information of the product is different from dimensional information of other products within the subject lane (i.e., in which the other products are the products that are supposed to be stored in that lane, per the planogram), the sensor output produced by the lane sensor may indicate dimensional information that is different from the dimensional information of those other products. For example, the lane sensor that produces the sensor output in such a case may be a time of flight sensor coupled to a top surface or bottom surface of the lane. In such a case, the wrong lane event may be detected based on the determination that the dimensional information for the product does not match the dimensional information for the other products that are stored in the subject lane.

At 710, data indicative of the wrong lane event is output. For example, data indicative of the wrong lane event may be output as an alert transmitted to an operator device to cause a user of that operator device to resolve the wrong lane event by moving the product in the wrong lane to a correct lane. The alert transmitted to the operator device may, for example, indicate one or more of the subject merchandiser device, the subject lane, or the subject product.

In some implementations, the wrong lane event may be considered a second event that occurs after a first event. For example, the first event may be a product retrieval event detected and processed as described with respect to the technique 600 shown in FIG. 6. In some such implementations, the second event associated with a lane of the merchandiser device (e.g., a second lane which is different from a first lane associated with the first event) may be detected based on sensor output (e.g., second sensor output) from a lane sensor (e.g., a second lane sensor) positioned for use with the second lane. Based on the second sensor output, dimensional information for a second product associated with the second event may be determined. Based on the dimensional information, a determination may be made that the second event is a wrong lane event for the second product.

In some implementations, the technique 700 may include determining that the wrong lane event remains unresolved when a new event associated with the same lane is detected. For example, the presence of the product associated with the wrong lane event within that lane may be maintained within a memory of a computing device of the merchandiser device. When the new event associated with the same lane is detected, a determination may be made as to whether the new event corresponds to a product being retrieved from a frontmost position of the lane. Where the new event so corresponds, the new event may be processed to recognize the retrieved product as the product associated with the wrong lane event. Thus, the new event may be processed to update an inventory record associated with the product associated with the wrong lane event rather than a product that is actually associated with the subject lane, and to update an account associated with the subject consumer by an amount corresponding to the product associated with the wrong lane event.

Figure 8:
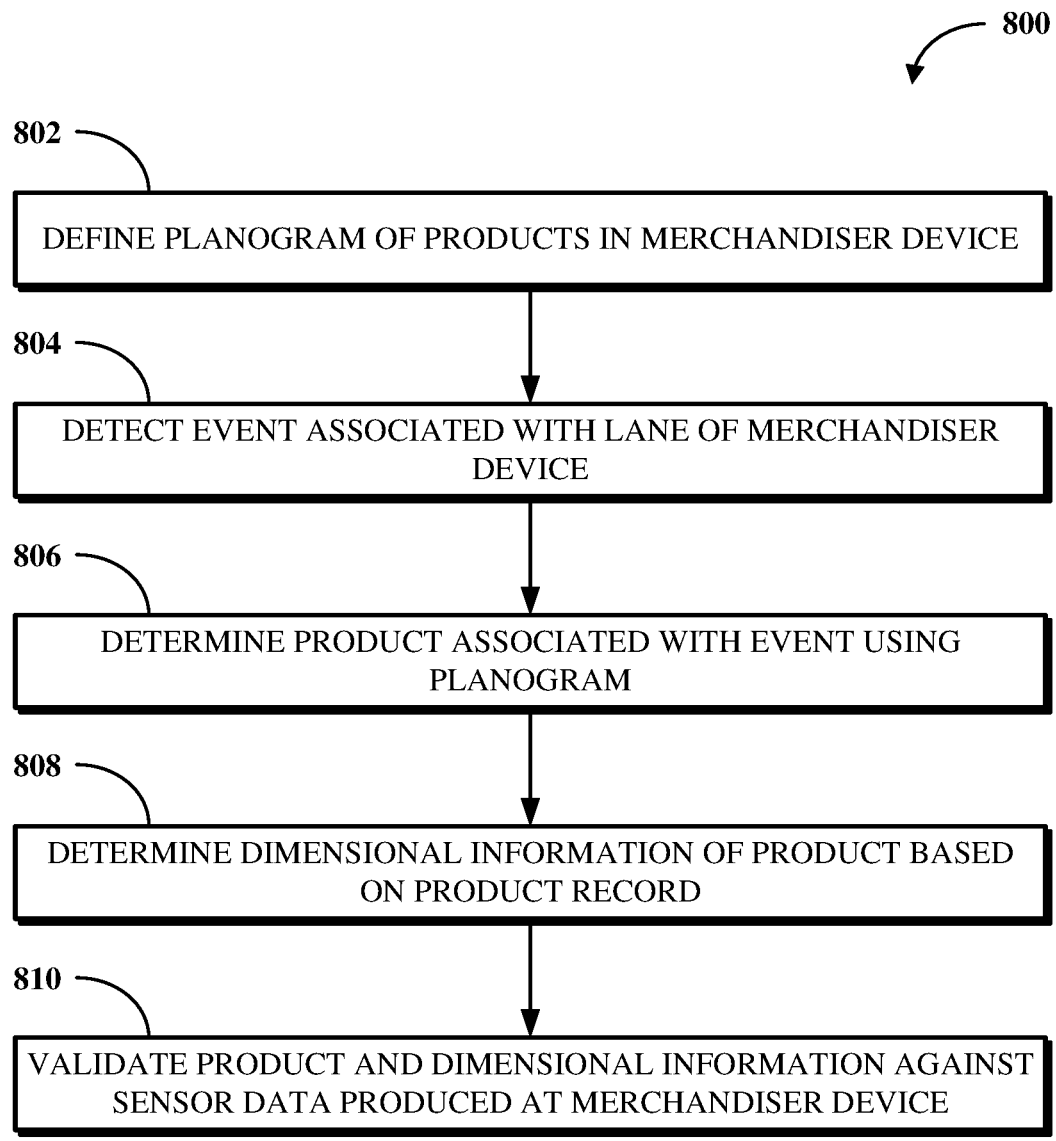
FIG. 8 is a flowchart of an example of a technique for validating sensor data against a planogram associated with a merchandiser device.

FIG. 8 is a flowchart of an example of a technique 800 for validating sensor data against a planogram associated with a merchandiser device. At 802, a planogram of products in a merchandiser device is determined. For example, the planogram may be accessed within a local memory or storage of a computing device of the merchandiser device. The planogram may be previously generated, such as based on a stocking of the merchandiser device.

At 804, an event associated with a lane of the merchandiser device is detected. For example, the detection of the event may be performed the same as or substantially similar to the detection of the event described above with respect to the technique 600 shown in FIG. 6.

At 806, a product associated with the detected event is determined using the planogram. The sensor output produced by the lane sensor positioned for use within the lane associated with the event may indicate or otherwise include information usable to identify a location, within the planogram of the merchandiser device, of the lane from which the sensor output derived (i.e., the lane in which the lane sensor that produced the sensor output is located). In that the planogram may specify which products are in which lanes, the location of that lane is then compared against the planogram to determine the products stored within that lane.

At 808, dimensional information of the product is determined based on a record associated with the product. For example, information associated with the planogram may indicate dimensional information for the products stored, per the planogram, within the various lanes of the merchandiser device. In another example, a data store separate from one associated with the planogram may be accessed based on an identification of the product to determine the dimensional information of the product.

At 810, the product and the dimensional information are validated against the sensor data produced at the merchandiser device. The sensor output may, for example, include information usable to determine identifying information for the product and/or dimensional information of the product. In such a case, the identifying information for the product and/or the dimensional information of the product may be compared against the corresponding information obtained based on the planogram and the record associated with the product. Where there is a mismatch indicated based on an output of that comparison, an alert may be generated to indicate that an update to the planogram may be required. Alternatively, where there is a match indicated based on an output of that comparison, the current planogram may be validated.

The implementations of this disclosure can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "mechanism," "module," or "monitor" as used herein and in the figures may be understood as corresponding to a functional unit implemented using software, hardware (e.g., an integrated circuit, such as an ASIC), or a combination of software and hardware. In certain contexts, such mechanisms, modules, or monitors may be understood to be a processor-implemented software mechanism, processor-implemented software module, or software-implemented monitor that is part of or callable by an executable program, which may itself be wholly or partly composed of such linked mechanisms, modules, or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While this disclosure has been described in connection with certain implementations, it is to be understood that this disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A merchandiser device, comprising:
   a storage area including multiple rows, wherein each row includes multiple lanes, and wherein each lane of each row is configured to store multiple products;
   a camera configured to capture images representative of activity within the storage area;
   a first set of multiple time of flight sensors positioned above or below a first lane of the storage area and configured to produce sensor output indicative of events associated with the first lane;
   a second set of multiple time of flight sensors positioned above or below a second lane of the storage area and configured to produce sensor output indicative of events associated with the second lane; and
   a computing device configured to:
   for a first event associated with a product at a first time:
   detect the first event based on first sensor output produced using a time of flight sensor of the first set of multiple time of flight sensors;
   determine first identifying information for the product and a quantity of multiple of the product associated with the first event, wherein the first identifying information is dimensional information of the product; and
   output data configured to cause an update to an inventory record associated with the product based on the first identifying information and the quantity; and
   for a second event associated with the product at a second time after the first time, wherein the second event is a wrong lane event indicating a placement of the product in the second lane:
   detect the second event based on second sensor output produced using a time of flight sensor of the second set of multiple time of flight sensors;
   determine second identifying information for the product using an image captured using the camera based on the detection of the second event, wherein the second identifying information is other than dimensional information of the product;
   compare the second identifying information and a planogram associated with the merchandiser device to determine that the product is different from a product associated with the second lane; and
   output, based on the determination that the product is different from the product associated with the second lane, an alert for the second event.

2. The merchandiser device of claim 1, wherein, to determine the first identifying information and the quantity, the computing device is configured to:
   determine the quantity based on a changed distance, indicated by the first sensor output, below or above the time of flight sensor in the first lane.

3. The merchandiser device of claim 2, wherein the first lane includes a pusher component that pushes the multiple products stored in the first lane toward a door of the merchandiser device,
   wherein, where the first event corresponds to the product being retrieved from the merchandiser device:
   the changed distance is caused by the pusher component pushing remaining products stored in the first lane forward, and
   the data indicates to decrease an inventory count associated with the inventory record by the quantity, and
   wherein, where the first event corresponds to the product being placed within the merchandiser device:
   the changed distance is caused by the pusher component being moved toward a rear interior surface of the storage area, and
   the data indicates to increase the inventory count associated with the inventory record by the quantity.

4. The merchandiser device of claim 1, wherein each lane includes a different set of multiple time of flight sensors.

5. The merchandiser device of claim 1, wherein the multiple time of flight sensors are included in a time of flight sensor strip downwardly facing the multiple products stored in the lane from a top surface of the lane or upwardly facing the multiple products stored in the lane from a bottom surface of the lane.

6. The merchandiser device of claim 1, wherein, to determine the first identifying information and the quantity, the computing device is configured to:
   determine the quantity based on multiple sensor outputs from the first set of multiple time of flight sensors.

7. The merchandiser device of claim 1, wherein, to determine the first identifying information and the quantity, the computing device is configured to:

determine the first identifying information based on one or more images captured using the camera.

8. The merchandiser device of claim 1, comprising:
a door; and
a door sensor configured to detect when the door is open,
wherein the camera is inactive prior to the first event and the computing device is configured to:
activate the camera based on output from the door sensor at the first time.

9. An apparatus, comprising:
a first set of multiple time of flight sensors associated with a first lane of a merchandiser device;
a second set of multiple time of flight sensors associated with a second lane of the merchandiser device;
a camera;
a memory; and
a processor configured to execute instructions stored in the memory to:
for a first event associated with a product at a first time:
detect the first event based on first sensor output from the first set of multiple time of flight sensors;
determine, based on the first sensor output, first identifying information for the product and a quantity of multiple of the product associated with the first event, wherein the first identifying information is dimensional information of the product; and
output data configured to cause an update to an inventory record associated with the product based on the first identifying information and the quantity; and
for a second event associated with the product at a second time after the first time, wherein the second event is a wrong lane event indicating a placement of the product in the second lane:
detect the second event based on second sensor output produced using a time of flight sensor of the second set of multiple time of flight sensors;
determine second identifying information for the product using an image captured using the camera based on the detection of the second event, wherein the second identifying information is other than dimensional information of the product;
compare the second identifying information and a planogram associated with the merchandiser device to determine that the product is different from a product associated with the second lane; and
output, based on the determination that the product is different from the product associated with the second lane, an alert for the second event.

10. The apparatus of claim 9, wherein the processor is configured to execute the instructions to:
determine an account associated with a consumer causing the first event; and
based on the first event, automatically update the account by an amount based on the identifying information and the quantity,
wherein, where the first event corresponds to the product being retrieved from the merchandiser device, the update corresponds to a charge to the account, and, where the first event corresponds to the product being placed within the merchandiser device, the update corresponds to a refund to the account.

11. The apparatus of claim 9, wherein the processor is configured to execute the instructions to:
determine that the product is different from the product associated with the second lane based on the second identifying information and the dimensional information of the product.

12. The apparatus of claim 9, wherein the processor is configured to execute the instructions to:
determine that the dimensional information of the product is identical to dimensional information of the product associated with the second lane.

13. A system, comprising:
a storage area of a merchandiser device, the storage area including multiple rows, wherein each row includes multiple lanes, and wherein each lane of each row is configured to store multiple products;
a camera configured to capture images representative of activity within the storage area;
a first set of multiple time of flight sensors positioned above or below a first lane of the storage area and configured to produce sensor output indicative of events associated with the first lane;
a second set of multiple time of flight sensors positioned above or below a second lane of the storage area and configured to produce sensor output indicative of events associated with the second lane; and
a computing device configured to:
detect, based on first sensor output from the first set of multiple time of flight sensors, a first event associated with a product within the first lane at a first time;
determine, based on the first sensor output, first identifying information for the product and a quantity of multiple of the product associated with the first event, wherein the first identifying information is dimensional information of the product;
output data configured to cause an update to an inventory record associated with the product based on the first identifying information and the quantity;
detect, based on second sensor output from the second set of multiple time of flight sensors, a second event associated with the product within the second lane at a second time after the first time;
determine second identifying information for the product using an image captured using the camera, configured for use with the storage area, and based on the detection of the second event, wherein the second identifying information is other than dimensional information of the product;
compare the second identifying information and a planogram associated with the merchandiser device to determine that the product is different from a product associated with the second lane; and
output, based on the determination that the product is different from the product associated with the second lane, an alert for the second event.

14. The system of claim 13, wherein, where the first event corresponds to the product being retrieved from the merchandiser device:
the first sensor output indicates that a distance between a time of flight sensor of the first set of multiple time of flight sensors and a portion of the first lane has increased based on the product being retrieved from the merchandiser device, and
the data indicates to decrease an inventory count associated with the inventory record by the quantity.

15. The system of claim 14, wherein the computing device is configured to:
determine an account associated with a consumer causing the first event; and
based on the event, automatically charge to the account an amount based on the first identifying information and the quantity.

16. The system of claim 13, wherein, where the first event corresponds to the product being placed within the merchandiser device:
- the sensor output indicates that a distance between a time of flight sensor of the first set of multiple time of flight sensors and a portion of the first lane has decreased based on the product being placed within the first lane, and
- the data indicates to increase an inventory count associated with the inventory record by the quantity.

17. The system of claim 16, wherein the computing device is configured to:
- determine an account associated with a consumer causing the first event; and
- automatically refund the account an amount based on the first identifying information and the quantity.

18. The system of claim 13, wherein the computing device is configured to:
- forecast an inventory event associated with the product based on the first event and one or more historical events associated with the first lane; and
- output an alert associated with the forecasted inventory event to an operator device associated with the merchandiser device.

19. The system of claim 13, wherein the computing device is configured to:
- automatically update at least a portion of the planogram based on images captured using the camera.

20. The system of claim 13, wherein the first set of multiple time of flight sensors are included in a sensor strip.

* * * * *